United States Patent
Esteban et al.

(10) Patent No.: US 8,443,052 B2
(45) Date of Patent: May 14, 2013

(54) TOPOLOGY AWARE CACHE STORAGE

(75) Inventors: Jairo O. Esteban, Freehold, NJ (US); Andre Beck, Batavia, IL (US); Volker Hilt, Middletown, NJ (US); Ivica Rimac, Tinton Falls, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/610,031

(22) Filed: Sep. 11, 2012

(65) Prior Publication Data

US 2013/0007187 A1 Jan. 3, 2013

Related U.S. Application Data

(62) Division of application No. 12/551,257, filed on Aug. 31, 2009.

(60) Provisional application No. 61/208,176, filed on Feb. 20, 2009.

(51) Int. Cl.
*G06F 15/167* (2006.01)
*G06F 15/16* (2006.01)

(52) U.S. Cl.
USPC ........... 709/213; 709/201; 709/214; 709/226; 711/118; 711/E21.001

(58) Field of Classification Search .................. 709/201, 709/213–214, 226–229, 242, 246; 711/117–118, 711/E12.001
See application file for complete search history.

(56) References Cited

U.S. PATENT DOCUMENTS

| 6,266,742 | B1 | 7/2001 | Challenger et al. |
| 6,442,565 | B1 * | 8/2002 | Tyra et al. ..................... 709/216 |
| 6,463,508 | B1 | 10/2002 | Wolf et al. |
| 7,143,170 | B2 | 11/2006 | Swildens et al. |
| 8,112,747 | B2 * | 2/2012 | Haeberle et al. .............. 709/224 |
| 2002/0078174 | A1 | 6/2002 | Sim et al. |
| 2009/0168795 | A1 | 7/2009 | Segel |
| 2009/0198833 | A1 | 8/2009 | Kisel et al. |
| 2011/0107030 | A1 | 5/2011 | Borst et al. |

OTHER PUBLICATIONS

International Search Report and the Written Opinion of the International Searching Authority, or the Declaration, mailed Jul. 13, 2010, in International Application No. PCT/US2010/023146, Alcatel-Lucent USA Inc., Applicant, 13 pages.

* cited by examiner

*Primary Examiner* — Bharat N Barot
(74) *Attorney, Agent, or Firm* — Wall & Tong, LLP

(57) ABSTRACT

A content distribution network (CDN) comprising a hierarchy of content storage nodes (CSNs) or caches having storage space that is allocated between local space for storing locally popular content objects and federated space for storing a portion of the less popular content objects. Local space and federated space based upon changes in content object popularity and/or other utility factors. Optionally, parent/child (upstream/downstream) communication paths are used to migrate content between CSNs or caches of the same or different hierarchical levels to avoid utilizing higher price top hierarchical level communications channels.

5 Claims, 7 Drawing Sheets

TOPOLOGY AWARE CACHE STORAGE

CROSS-REFERENCE TO RELATED APPLICATION

This application is a divisional of pending U.S. patent application Ser. No. 12/551,257, filed on Aug. 31, 2009, entitled TOPOLOGY AWARE CACHE STORAGE, which application claims the benefit of provisional patent application Ser. No. 61/208,176, filed on Feb. 20, 2009; both prior applications are incorporated herein by reference.

FIELD OF THE INVENTION

The invention relates to the field of content distribution networks and, more specifically, to managing content distribution and storage.

BACKGROUND

Content distribution networks (CDNs) consist of caches that are distributed across the network infrastructure. These caches are typically arranged in hierarchies that follow the underlying network topology. Each cache typically comprises a network element or node having associated with it a mass storage device for storing content. Each cache only serves users that are directly attached to the cache; that is, users that are located in the distribution hierarchy below the cache. The cooperation between caches is largely limited to the exchange of traffic between parent and sibling caches. In this architecture, all caches at the same level in the hierachy largely have the same content. Once they receive a request, they can either serve the requested content directly if stored in the cache (i.e., a cache hit), or if the content is not stored in the cache (i.e., a cache miss), forward the request to a parent cache.

With a flattening of the underlying network infrastructure and the ability to reach into a content distribution hierachy via IP addressing, it is possible for a cache to retrieve content from other caches in the content distribution network. That is, a child cache can request an item from a cache other than its parent cache if the child cache does not have a copy of the requested content object or title stored locally. In a flattened content distribution network, an initial decision is made as to which content objects or titles should be stored in which caches and how often a content object should be stored in the overall CDN. Content requests are routed to the cache best able to respond to the request. Beyond an initial distribution of content objects, there is no further coordination of stored content between caches.

SUMMARY

These and various other deficiencies of the prior art are addressed by a system, method and apparatus providing coordinated global and local cache management functions within the context of a content distribution network (CDN). A local cache or content storage node (CSN) includes a local mass storage device partitioned or allocated between local and federated space, where local space is primarily devoted to more popular content and federated space is primarily devoted to less popular content. A utility parameter associated with each content object is monitored and used to migrate content between local space and federated space within the various caches forming the CDN. The federated space is managed as part of a much larger, virtual federated space formed by combining the federated space of multiple CSNs.

Optionally, reverse channel capacity between parent and child content storage nodes is used to facilitate the efficient migration of content between caches at the same or different hierarchical level. The decision to use this reverse channel capacity is influenced by the cost of available types of communications channels, the cost of mass storage, content object file size and/or other factors.

Thus, various embodiments take advantage of the cooperation of a distributed set of cache nodes inside a network along with, optionally, the knowledge of the underlying network topology to reduce the cost of transit bandwidth by leveraging the use of disk space and unused uplink capacity.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the Figures.

DETAILED DESCRIPTION

The present invention will be described within the context of a content distribution network (CDN) comprising a hierarchy of content storage nodes or caches in which parent/child (upstream/downstream) communication paths are used to migrate content between caches of the same or different hierarchical levels.

Various embodiments allocate individual cache storage between local and federated space, where local space is primarily devoted to more popular content and federated space is primarily devoted to less popular content. Parameters indicative of content popularity are monitored and used to migrate content between local space and federated space within the various caches forming the CDN. The relative amount of local space and federated space within a cache may change over time in response to global or local changes in content popularity, dissimilar levels of content requests between caches, local/regional content tastes and the like.

Various embodiments utilize existing reverse channel capacity between parent and child content storage nodes to facilitate the efficient migration of content between caches. In this manner, less expensive (and already existing) forward and reverse data channels associated with a parent node may be used to migrate content between child nodes associated with a common parent node.

Part of the invention lies in the recognition by the inventors that while network traffic within content distribution networks is often asymmetric, with higher demands in the downstream direction than in the upstream direction, most parts of today's networks have symmetric capacities. Thus, upstream bandwidth is often available and underutilized such that peer-to-peer (e.g., child to child) migration of content may be performed without increasing the transport resources of the network since existing (idle) resources may be employed.

Various embodiments utilize these otherwise idle network resources to increase the amount of content migration between caches to more intelligently pool cash resources within the context of a federated cache. The combined or federated cache CDN offers significantly larger content storage than traditionally available in hierarchal content distribution systems due in part to reduction in the number of content objects or objects that need to be stored at each cache. An increase in peer-to-peer fulfillment of content requests also reduces the number of requests that must be sent upstream to content evolves or other network elements associated with very expensive communications resources.

Figure 1:
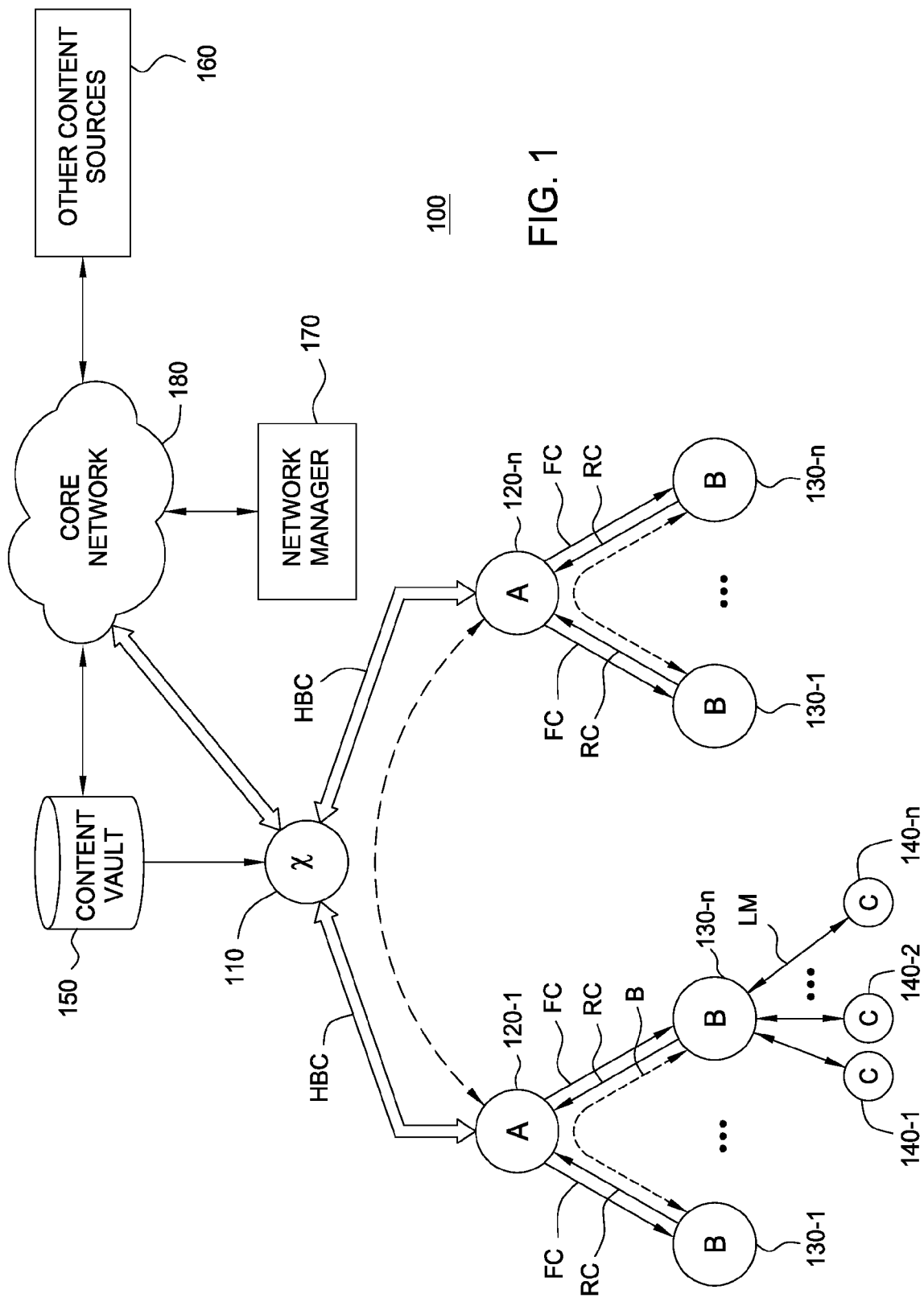
FIG. 1 depicts a high-level block diagram of a content distribution system (CDS) according to one embodiment.

FIG. 1 depicts a high-level block diagram of a content distribution system (CDS) according to one embodiment. The CDS 100 of FIG. 1 operates to distribute content such as movies, television programs, music and the like. Generally speaking, content objects or objects are initially stored in a content vault or provided by some other content source, such as a remote server or cache within the CDS.

Specifically, the content distribution system 100 of FIG. 1 comprises a central or top-level content aggregation node 110 that receives content from any of a content vault 150 or other content sources 160. The content aggregation node 110 distributes content to each of a plurality of second-level network elements operating as content storage nodes, denoted as network elements 120-1 through 120-N (collectively second-level network elements 120). Each of the second-level network elements 120 distributes content to a respective plurality of third-level network elements operating as content storage nodes, denoted as network elements 130-1 through 130-N (collectively third-level network elements 130). Each of the third-level network elements 130 distributes content to a respective plurality of client devices, denoted as 140-1 to 140-N (collectively client devices 140).

The content aggregation node 110, second-level network elements 120 and third-level network elements 130 collectively represent an access network suitable for enabling access to a core network 180 by the client devices 140 as needed.

The content vault 150 is depicted as communicating with the content aggregation node 110 directly and/or via the core network 180, while the other content sources 160 are depicted as communicating with the content aggregation node 110 via the core network 180.

Also depicted is a network manager 170 in communication with the core network 180. The network manager 170 operates in various embodiments as a content manager that is adapted to manage federated space allocations within mass storage devices of a plurality of content caches.

It will be appreciated by those skilled in the art that while the network manager 170 is depicted as communicating only with the core network 180, the network manager 170 may communicate with any suitable network element within the network being managed, such as content aggregation node 110. Moreover, while depicted as a distinct element, the network manager 170 may be included within any of the content aggregation node 110, second-level network elements 120 and third-level network elements 130.

The content distribution system 100 depicted in FIG. 1 is a simplified representation of one embodiment. The inventors contemplate that various modifications may be made to this system 1. For example, it will be appreciated by those skilled in the art that while a single content aggregation node 110 is depicted to simplify the discussion, multiple content aggregation nodes may also be used and such use is contemplated by the inventors. Similarly, while only two hierarchical levels of content storage nodes are depicted (120/130), more or fewer hierarchical levels of content storage nodes may be used within the context of the various embodiments. In addition, the use of the term "plurality" as it relates to the number of content storage nodes, client devices and the like should not be construed as indicative of a specific number. For example, the plurality N of second-level network elements 120 does not need to be the same as the plurality N of third-level network elements 130 and/or plurality N of client devices 140.

Content aggregation node 110 conveys content to each of the second-level content storage nodes 120 via respective high-bandwidth (and high cost) communication channels HBC. Second-level content storage nodes 120 communicate with corresponding third-level content storage nodes 130 via respective forward channels FC and reverse channels RC. Third-level content storage nodes 130 communicate with their respective neighborhoods of client devices 140 via, illustratively, standard last mile communications channels (LM). In one embodiment related to telecommunications networks, the content aggregation node 110 comprises an inter-office communications center, each of the second-level content storage nodes 120 comprise central offices (CO), and each of the third-level content storage nodes 130 comprise digital subscriber line access multiplexers (DSLAMs). In other embodiments relating to cable television networks, the content aggregation nodes comprise cable-television head end devices.

Each of the content storage nodes 120/130 is associated with one or more mass storage devices for storing content objects. An exemplary arrangement of a content storage node will be discussed in more detail below with respect to FIG. 2.

In normal operation, a client device 140 requests content from the content storage node 130 serving a client device. If the mass storage device associated with the content storage node 130 includes requested content, then the content is served directly to the client device. If not, then the content must be retrieved from another content storage node, the content aggregation node 110, the content vault 150 or some other content source 160. In the latter case, the user experience is somewhat degraded by the amount of time necessary to retrieve and serve the requested content.

Each of the content storage nodes 120/130 is only capable of storing in its mass storage device(s) a portion of the total content available via the CDN. The mass storage associated with a content storage node 120/130 is allocated between local space and federated space, as will be discussed more detail below.

Each content object within the content distribution system has associated with it a utility parameter. The utility parameter is based upon one or more of the following factors: popularity of a content object, file size of a content object, location of a content object, cost to retrieve a content object and other factors. These factors are optionally weighted with respect to each other. The factors associated with the utility parameter of a content object are selected in response to the relative popularity of content, cost of storage space, peer-to-peer bandwidth usage, parent to child bandwidth usage and the like.

The utility level of a content object is optionally structured within the context of a local utility level and/or a federated utility level, where a local utility level comprises the utility level of a content object as it relates to a subnetwork of client devices associated with a CSN and a federated utility level comprises the utility level of a content object as it relates to the entire CSN.

Various embodiments adapt the specific content objects stored in local space and federated space in response to changes in a utility parameter associated with available content objects. For example, in one embodiment the most popular content objects are stored in local space at each content storage node, while the less popular content objects are distributed across the federated space in all of the content storage nodes. Local space at a content storage node is finite, thus a rank ordered list of content objects based upon relative utility is employed to determine which content objects are stored in local space. Preference may be given to more popular content objects, smaller file size content objects and the like. If a content object becomes less popular over time (e.g., relative utility decreases), it may be "demoted" from local space and put into federated space. Similarly, if a content object becomes more popular over time (e.g., relative utility increases), it may be "promoted" to local space from federated space, a content vault or other content source.

Generally speaking, more popular and therefore more frequently requested content objects or titles will tend to have a higher value utility parameter such that these content objects or titles will tend to be stored in local space. In this manner, very popular content objects such as new movies, television programs, sporting events, music and the like will tend to be locally stored for more rapid streaming to requesting users.

Various and further embodiments adapt the ratio of local space and federated space of a content storage node in response to changes in costs associated with satisfying content object requests. For example, where mass storage is relatively cheap and bandwidth costs (e.g., between content aggregator 110 and second-level content destination nodes 120) are relatively expensive, it becomes desirable to locally store more content objects, larger file size content objects and so on. In this case, increased mass storage device size and/or increased allocation to local space of the mass storage device is desired. Similarly, in a scenario where mass storage is relatively expensive and bandwidth costs are relatively cheap, it becomes desirable to locally store fewer content objects, smaller file size content objects and so on. In this case, decreased mass storage device size and/or decreased allocation to local space of the mass storage device is desired.

Various and further embodiments operate to move content toward the content storage nodes most likely to need that content, such as moving ethnic-specific content to content storage nodes serving the corresponding ethnic group. This may occur where increasing requests for ethnic-specific content increases the relative utility level of such content.

In various embodiments, the network manager 170 adapts local space and federated space allocations within one or more mass storage devices associated with caches are content storage nodes. In various embodiments, the network manager 170 adapts the operation of content storage nodes by, illustratively, adapting the relative weighting of factors used to define a utility parameter associate with each content object. In this manner, storage allocation methodologies may be adapted in response to changes in network performance and/or cost criteria.

In various embodiments, the network manager 170 causes the content distribution system to distribute relatively less popular content within a virtual federated space created by logically combining or aggregating the federated space allocations within the mass storage devices associated with the content of this tradition notes. Various distribution methodologies are contemplated, including distribution methodologies based upon one or more of the factors discussed below with respect to content object utility.

Figure 2:
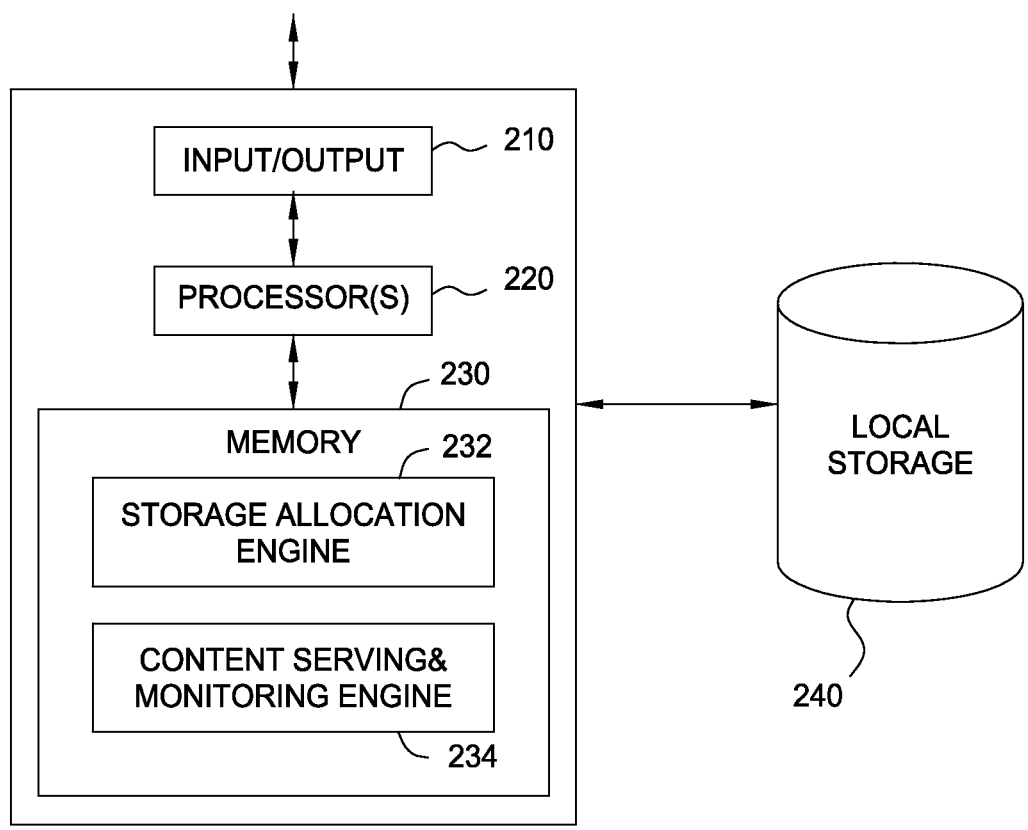
FIG. 2 depicts a high-level block diagram of a general-purpose computer suitable for use in performing the functions described herein.

FIG. 2 depicts a high-level block diagram of a general-purpose computer suitable for use in performing the functions described herein. Specifically, the system 200 includes one or processing elements 220 (e.g., a central processing unit (CPU)), a memory 230, e.g., random access memory (RAM) and/or read only memory (ROM) and various input/output devices 210 (e.g., storage devices, including but not limited to, a tape drive, a floppy drive, a hard disk drive or a compact disk drive, a receiver, a transmitter, a speaker, a display, an output port, the communications network interface and a user input device (such as a keyboard, a keypad, a mouse, and the like)). In addition, a local storage device 240 is depicted, such as one or more mass storage devices, such as hard disk drives, disk drive arrays and the like.

The system 200 is a simplified representation of basic computing elements useful in implementing the various functions described herein with respect to the content, content storage nodes 120/130 and/or client devices 140 depicted above with respect to FIG. 1. The memory 230 is depicted as including a storage allocation 232 and a content serving and monitoring engine 234. In various embodiments, the storage allocation engine 232 comprises software instructions executed by each of the content storage nodes 120/130. In various embodiments, the content serving and monitoring engine 234 comprises software instructions executed by the content aggregation node 110, network manager 170 and/or a distribution node 120/130.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions. Thus, one embodiment comprises an apparatus including a memory for storing software instructions and a processor for executing the software instructions, wherein the software instructions when executed by the processor cause the apparatus to perform one or more methods according to the various embodiments discussed herein.

Methods according to the various embodiments coordinate the operation of the various content caches or content storage nodes to provide thereby a cache federation (i.e., a plurality of caches that cooperate with each other). In this manner, the content most likely to be requested by a client device is also the content most likely to be readily available to the client device.

In various embodiments, a variable fraction of the available memory at a content storage node is allocated to the cache federation. Memory that is not allocated to the cache federation is managed locally, while memory that is allocated to the cache federation is managed in a coordinated manner with respect to cache federation allocated memory of other content storage nodes.

In one embodiment, memory not allocated to the cache federation is used to store content objects that are deemed to be most popular. The popularity of a content object may be determined with respect to a totality of users (e.g., number of content object requests associated with a specific node, group of nodes or entire network), regional demographics associated with a particular content storage node and so on. Consequently, a popular content object or title may be stored multiple times in the locally managed memory of many (or all) of the content storage nodes.

In one embodiment, memory allocated to the cache federation is used to store content objects that are less popular than the content objects stored in memory not allocated to the cache federation. In various embodiments, only a single copy of the less popular content objects is stored within the cache federation. For example, assuming a cache federation of 10 content storage nodes storing a total number of 10,000 less popular content objects, each of the 10 content storage nodes within the cache federation stores a respective 1000 (approximately) less popular content objects. In other embodiments, some or all of the less popular content objects are stored at multiple content storage nodes (though not at all content storage nodes). The effect of the cache federation is to pull the available memory of multiple content storage nodes or caches to form a single large cache.

Figure 3:
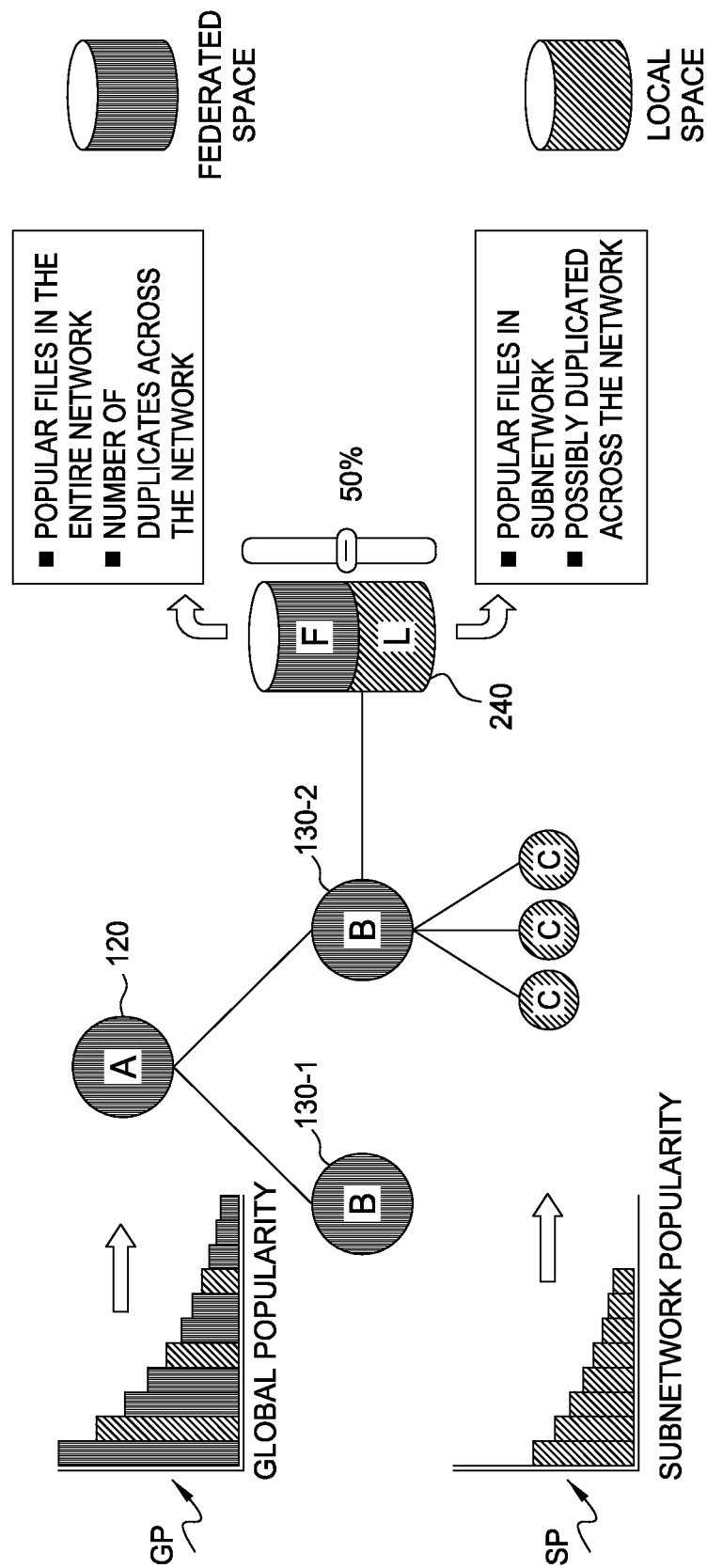
FIGS. 3-5 graphically depict cache memory usage according to various embodiments.

FIG. 3 graphically depicts local and federated memory space from a single cache perspective. Specifically, FIG. 3 depicts a parent content storage node 120 in communication with two child content storage nodes 130-1 and 130-2. Content storage node 130-2 is depicted as communicating with several client devices 140 within a respective subnetwork. A mass storage device 240 associated with content storage node 130-2 is depicted as having storage space allocated between federated space and local space.

FIG. 3 also depicts a global popularity graph (GP) and a subnetwork popularity graph (SP). The global popularity graph depicts content popularity within the context of users associated with all of the content storage nodes in the CDN (or a geographic region of the CDN). The subnetwork popularity graph depicts content popularity within the context of users associated with a particular content storage node. Each vertical slice of the graphs is associated with one or more content objects having a particular popularity rating (or range of popularity ratings), where the length of the vertical slices indicates the relative popularity of content object(s). That is, a relatively longer vertical slice indicates relatively more popular content.

The local space includes the most popular files and content objects as defined by the subnet users or client devices. That is, within a local space of a content storage node associated with the subnetwork, one or more of the top popularity segments are stored. Since users or client devices in subnetworks associated with other content storage nodes may exhibit similar content preference or popularity in these other subnetworks, a possible duplication of files and/or content objects elsewhere within the content distribution network may result. A graphical representation of subnetwork popularity of content objects for a specific subnetwork is shown in the subnetwork popularity graph SP.

The federated space includes a portion of the remaining files and content objects available within the content distribution system. That is, within the federated space of the content storage node associated with the subnetwork, one or more of the remaining popularity segments will be stored. Other segments of popular content objects or titles are stored in federated space allocated on mass storage devices associated with one or more other content storage nodes.

It is noted that the popularity curve associated with the federated space includes segments which are stored across multiple caches forming the totality of the federated storage space or virtual federated storage space. Methods according to the various embodiments will adapt the ratio of local to federated storage space as well as the content objects stored in the local and federated storage space such that a gradual progression towards a more efficient distribution of content objects across the content distribution network is achieved. This efficiency, as discussed in detail herein, reflects both content migration/server efficiencies as well as bandwidth utilization efficiencies, such as reverse channels in peer-to-peer communications within the hierarchical topology.

In one embodiment, the federated space includes files and content objects that are popular within the entire content distribution network without duplicating content objects available elsewhere within the content distribution network.

In another embodiment, the federated space includes files and content objects that are stored at multiple content storage nodes. Such multiple-copy storage of content objects within federated space is especially useful within the context of geographic distribution and/or hierarchical distribution of content objects within the content distribution system. In this embodiment, the number of copies of a content object stored within federated space is optionally limited to a threshold number or count.

Figure 4:
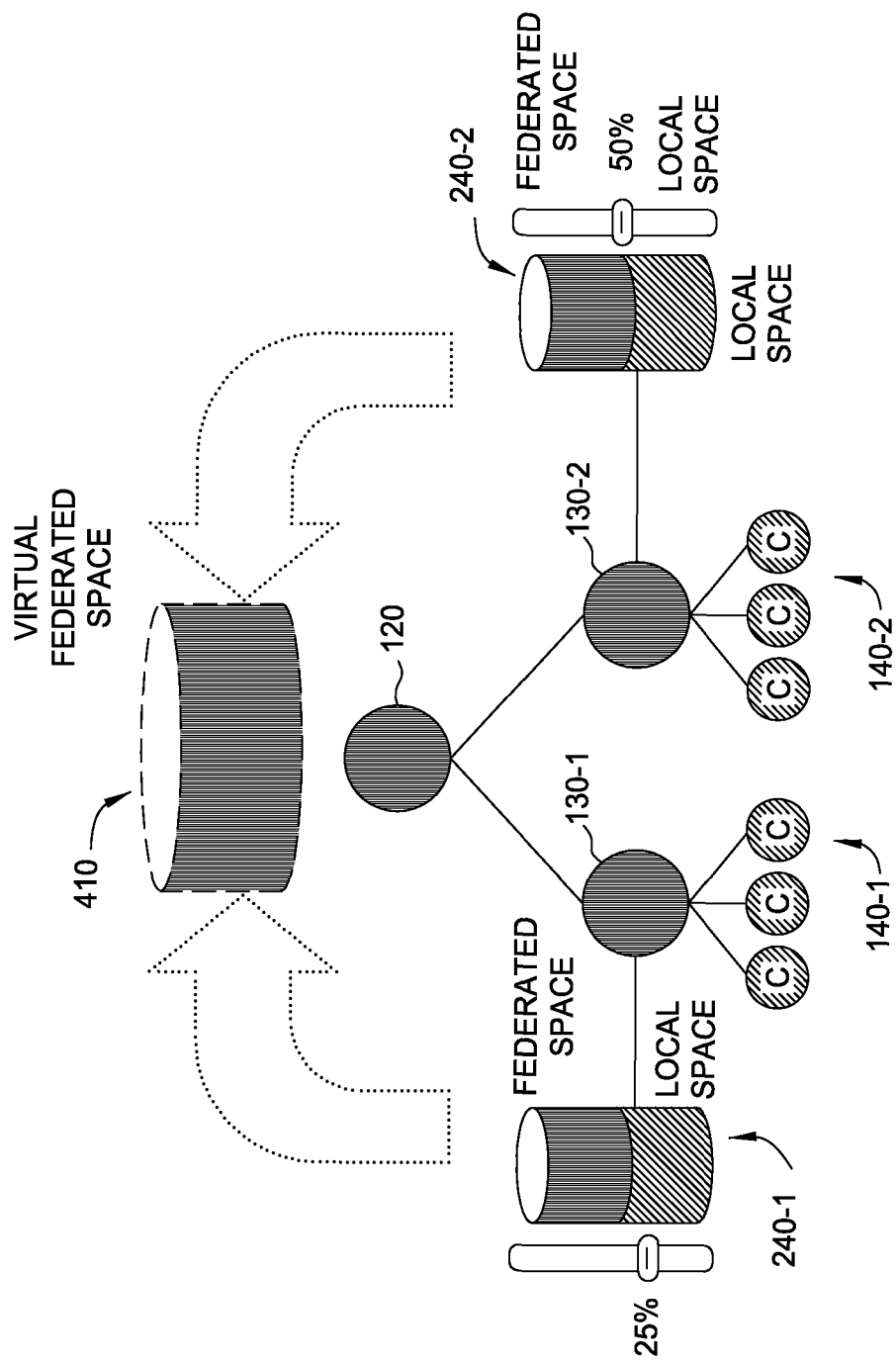

FIG. 4 graphically depicts local and federated memory space from a network perspective. Specifically, FIG. 4 depicts a parent content storage node 120 in communication with two child content storage nodes 130-1 and 130-2. Each of the content storage nodes 130 is depicted as communicating with a respective subnetwork of client devices 140. Each of the content storage nodes 130 is associated with a respective mass storage device 240. Mass storage device 240-1 is depicted as allocating 75% of its capacity to federated space and 25% of its capacity to local space. Mass storage device 240-2 is depicted as allocating 50% of its capacity to each of federated and local space.

From the network perspective, a virtual federated space 410 is defined by the federated space allocations of the two mass storage devices. Within the context of a CDN adding many more content storage nodes, the virtual federated space 410 becomes increasingly larger as the allocated amount of federated space increases.

The above-described cache federation is capable of storing a very large number of content objects and therefore serves a very large number of content tunnel requests. However, the distributed storage of content objects among content storage nodes within the cache federation increases traffic between the various content storage nodes as content objects or titles are moved between caches to satisfy user requests.

Generally speaking, each cache in the cache federation stores a copy of the most popular items in its local memory. It stores a copy of items that are less popular than the local items but more popular than items that are not stored in its federated memory, if they are not stored in federated memory of another cache. It routes requests for content that it does not have but that is stored in another cache in the federation to this cache.

The split between local and federated memory is dynamic and can be changed. The amount of memory devoted to federated caching controls the load on i) peering links and ii) links between caches. That is, the allocation of memory resources is optionally tuned according to the link usage between caches. If bandwidth between caches is available, resource allocation between federated and local can be used to lower the load towards the origin server by increasing the fraction of federated memory.

A special case is if federated caches are connected through a topology wherein traffic exchanged between caches traverses an uplink from the source cache to a next hop router and then downstream to a target cache. In most networks, the uplink is underutilized due to the asymmetry of Internet traffic and can be used for cache cooperation. The load on the downlink will only change marginally, and such change would be inevitable since the content will still need to be delivered to the target cache. In this configuration, the traffic exchanged between caches does not compete with other traffic. In this scenario, illustratively devoting 95% of memory to federated caching and 5% to local caching has been determined by the inventors to be a robust setting that performs well across many topologies, such as those depicted below with respect to FIG. 5.

Figure 5:
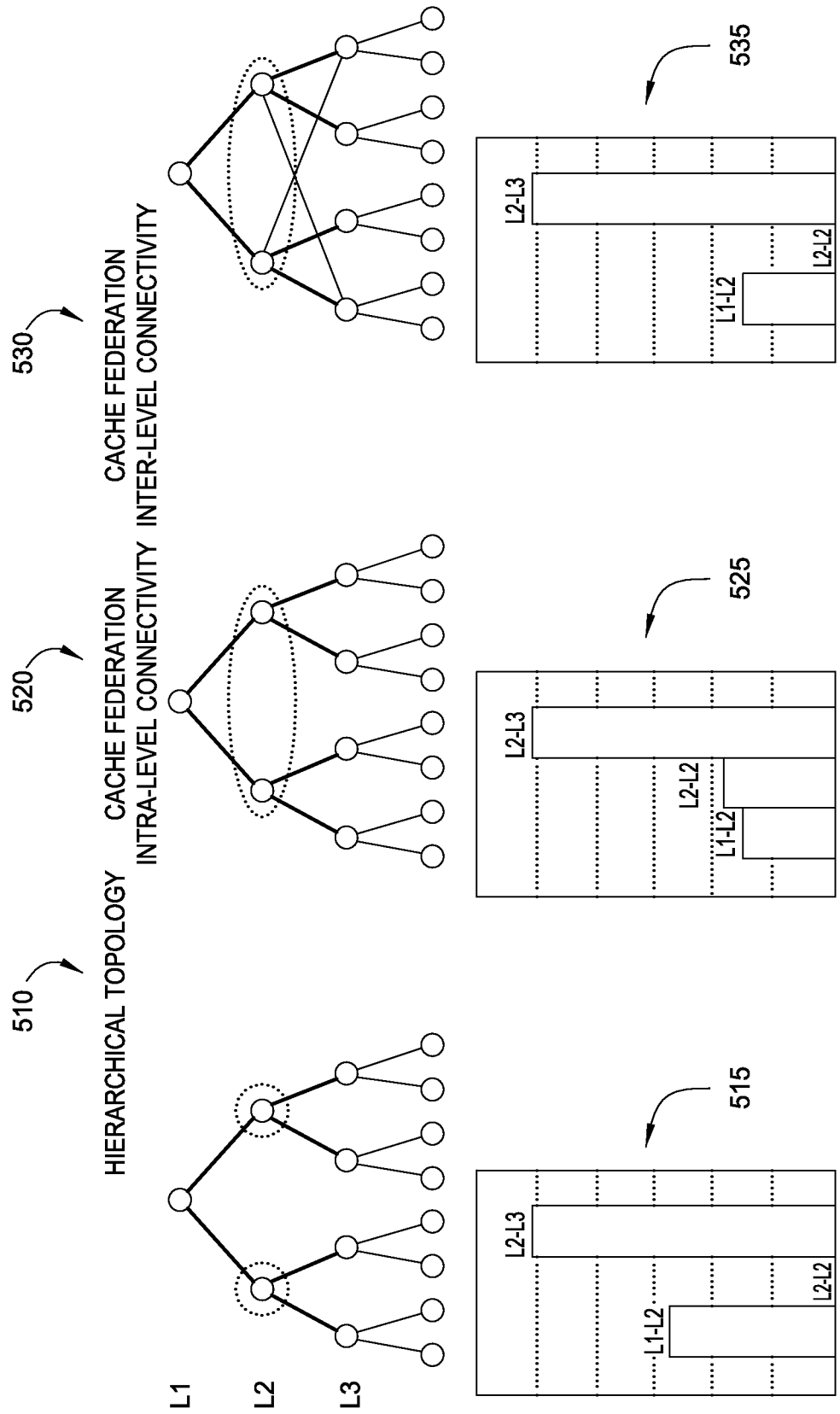

FIG. 5 graphically depicts several content distribution network topologies. Specifically, FIG. 5 graphically depicts block diagrams of a hierarchical topology 510, cache federation intra-level connectivity topology 520 and cache federation inter-level connectivity topology 530. Each of the topologies 510-530 comprises, illustratively, three hierarchical levels of content storage nodes or caches denoted as L1, L2 and L3, such as depicted above with respect to the system 100 FIG. 1. The lowest hierarchical level (L3) distributes content to the client devices C requesting such content. The cost of L1-L2 communication resources is greater than the cost of L2-L3 communication resources. The cost of L2-L3 communication resources is greater than the cost of L3-L2 client communication resources.

As described herein, various embodiments improve the efficiency of a content distribution network by leveraging underutilized resources within that network. Specifically, various embodiments adapt the cache federation algorithms described herein to dynamically shift load between uplinks and downlinks within the CDN, thereby causing upstream and downstream traffic between hierarchical levels to be more symmetric. That is, by balancing L2-L3 traffic to the extent possible, a significant reduction in L1-L2 traffic may be achieved. This reduction in L1-L2 traffic provides a tremendous cost saving to network operators. In general, increasing the amount of memory allocated to federated space increases the amount of L3-L2 upstream traffic and decreases event of L1-L2 downstream traffic.

FIG. 5 depicts corresponding bar graphs 515, 525 and 535 under, respectively, topology models 510, 520-530. Each bar graph indicates, from left to right, and L1-L2 communication level/cost, and L2-L2 communication level/cost and an L2-L3 communication level/cost.

In hierarchical topology 510, nodes or caches within each of the hierarchies L1, L2 and L3 only communicate with parent or child nodes. The cache federation intra-level connectivity topology 520 improves upon the hierarchical topology 510 by adding L2-L2 communication. The added L2-L2 communication operates to reduce L1-L2 communications and therefore lower L1-L2 communications costs. Similarly, the cache federation inter-level connectivity topology 530 improves upon the hierarchical topology 510 by adding additional L2-L3 communications channels. The added L2-L3 communication channels also operate to reduce L1-L2 communications and therefore lower L1-L2 communications costs Thus, embodiments envision content distribution networks architected using topologies according to any of the specific topologies 510-530 depicted in FIG. 5. Alternate embodiments envision content distribution networks architected using modifications to these topologies, such as adding L2-L2 links or communication channels along with additional L2-L3 links or communication channels.

The content distribution network (CDN) topology described above respect to FIGS. 1 and 5 provides a hierarchical arrangement of content storage nodes (CSNs) in which lowest hierarchical level CSNs are associated with respective groups of clients, higher hierarchical level CSNs are associate with respective lower groups of CSNs and so on. Each of a plurality of top hierarchical level CSNs is shown as communicating with content aggregation node 110. It should be noted that functions associated with the content aggregation node 110 may be performed by, illustratively, one or more top hierarchical level CSNs.

The network manager utilizes the various storage allocation methodologies to adapt federated and local space allocations within content caches were CSNs of any of the topologies in a manner tending to improve efficiency and lower cost. As previously discussed, changes in network topology such as the addition or deletion of peer-to-peer links, inter-level connectivity, intra-level connectivity, overloading of communication channels (i.e., bandwidth utilization above the desired special level) and the like are used by the network manager to responsibly adapt federated/local space allocations within one or more CSNs.

Figure 6:
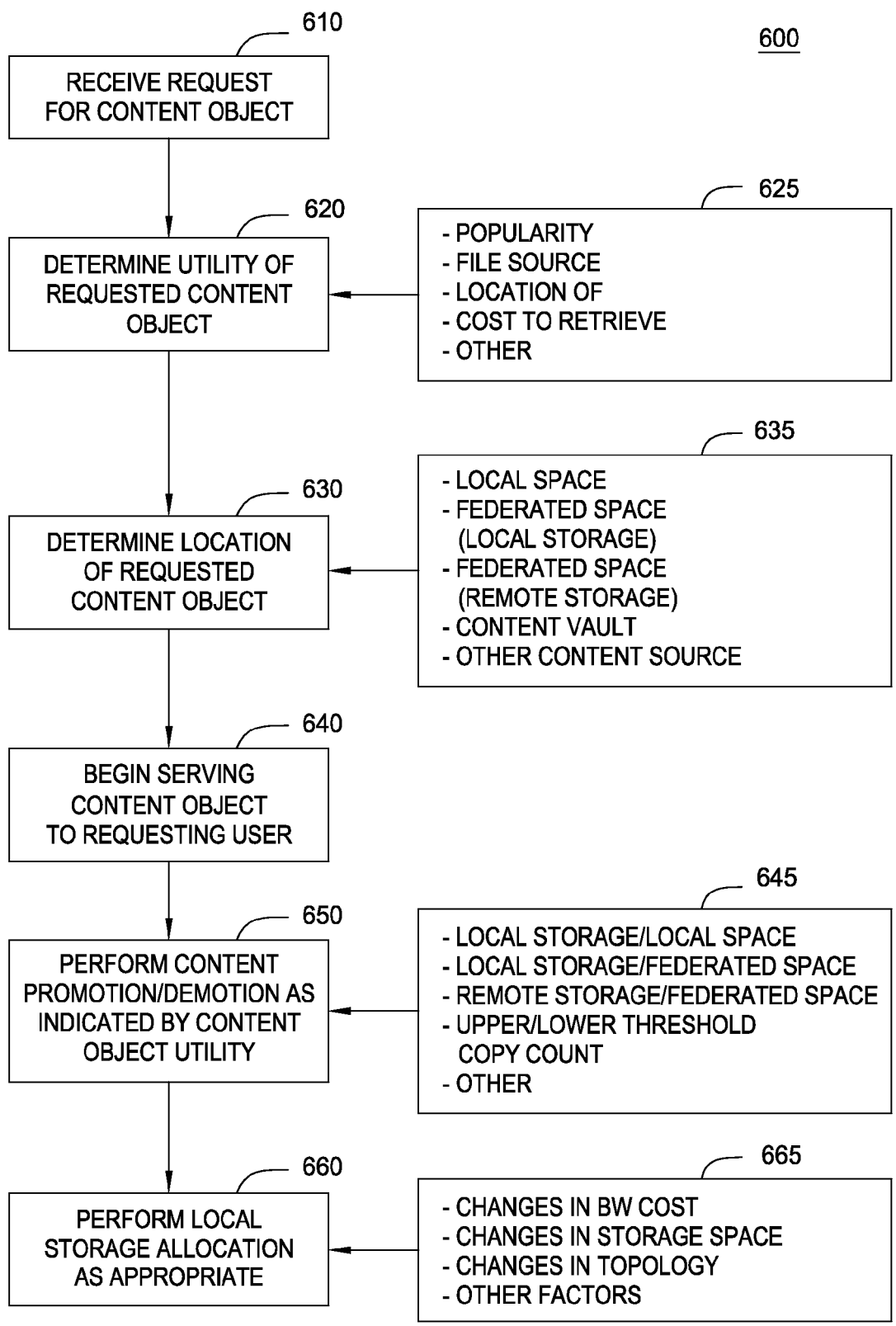
FIG. 6 depicts a flow diagram of a storage allocation method according to one embodiment.

FIG. 6 depicts a flow diagram of a storage allocation method according to one embodiment. The storage allocation method 600 is suitable for use within, for example, a content storage node such as described above with respect FIG. 1.

The method 600 is entered at step 610, when a request for a content object is received, such as from a client 140.

At step 620, the utility of the requested content object is determined. That is, referring to box 625, the utility parameter associated with the content object is determined using one or more of the following factors: popularity of the content object, file size of the content object, location of the content object, cost to retrieve the content object and/or other factors.

At step 630, the location of the requested content object is determined. That is, referring to box 635, a determination is made as to whether the requested content object is stored in local space within a local storage device, federated space within a local storage device, federated space within a remote storage device, a content vault or other content source.

At step 640, serving of the content object to the requesting user is initiated. That is, in various embodiments a session is established between the requesting user and server associated with the requested content object wherein the requested content object is transmitted to the user as a content stream or file.

At step 650, a content promotion/demotion method is performed as indicated by the utility parameter associated with the requested content object. Referring to box 645, depending upon its utility level the requested content object is preferentially stored in (in descending order of preference) local space of the local storage device, federated space of the local storage device and federated space of a remote storage device. Assuming that the local space of a local storage device is fully utilized, storage of the requested content object in the local space requires the deletion (i.e., demotion) of an existing stored content object from local space. The content object demoted from local space (or the requested content item if its utility level is too low) is then preferentially stored in federated space of the local storage device, which may in turn require the deletion (demotion) of an existing stored item from this federated space. The requested or demoted content object having the lowest utility level is then preferentially stored in federated space of another content storage node. One embodiment of a content promotion/demotion method is discussed below with respect to FIG. 7.

Optionally, a promotion/demotion method associated with the requested content is adapted in response to one or both of an upper and lower threshold copy count. In one embodiment, the upper threshold copy count is a maximum number of copies of a content object that may be stored in federated space. In one embodiment, the lower threshold copy count is a maximum number of copies of a content object that may be stored in federated space where the storage of an additional copy will result in the deletion/demotion of another content object. In other embodiments, only a single threshold copy count is associated with each content object, the single threshold copy count representing the number of times a content object may be stored in federated space.

It will be appreciated that in various embodiments the frequency of storage decisions might be higher than information exchanged in the content delivery system such that the actual number of copies may vary. Thus, at any given time the copy count might be less or greater than the target value/threshold.

At step 660, local storage allocation is performed as appropriate. That is, at step 660 the ratio of local space allocation to federated space allocation of a mass storage device is adapted as appropriate. Referring to box 665, such allocation is adapted in response to changes in bandwidth cost (i.e., reductions or increases in the cost of L1-L2 or L2-L2 bandwidth), changes in storage cost (i.e., reductions or increases in the cost of mass storage or cache memory), changes in topology (such as depicted above with respect FIG. 5) and/or other factors.

It will be appreciated by those skilled in the art that while the method 600 of FIG. 6 is depicted as implementing steps in a particular order, the specific order of the may be modified while still practicing the invention. For example, the steps of serving a content object (640) to a requesting user may be initiated before or after determining the utility of the requested content object (620), performing any promotion/demotion associated with the requested content object (650) or performing any local storage reallocation (660). Similarly, local storage reallocation (660) may be performed at any time.

Figure 7:
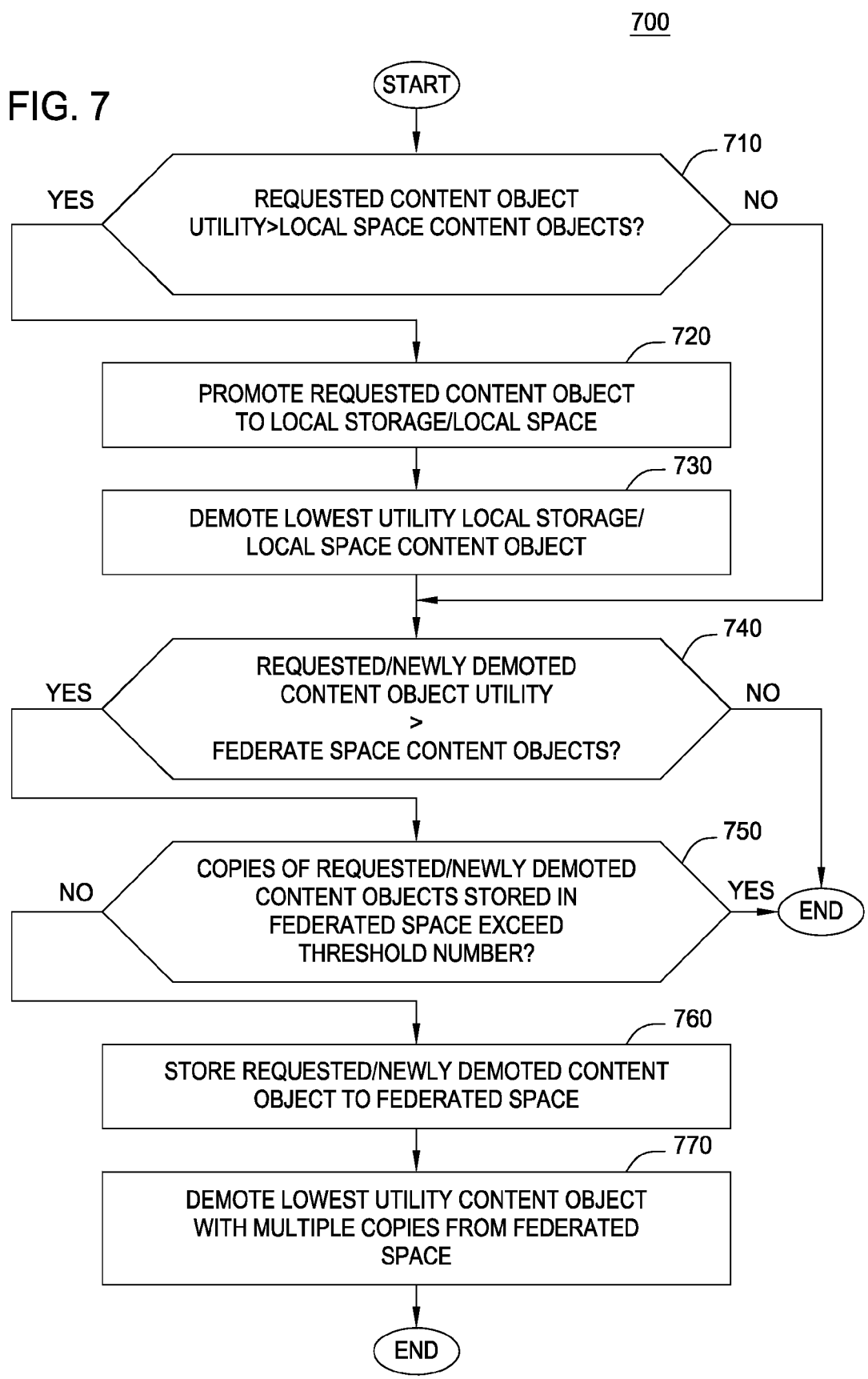
FIG. 7 depicts a flow diagram of a content promotion/demotion method suitable for use in the storage allocation method of FIG. 6.

FIG. 7 depicts a flow diagram of a content promotion/demotion method. The content promotion/demotion method of FIG. 7 is suitable for use within, for example, the storage allocation method 600 of FIG. 6.

The method 700 is entered at step 710, when the utility of the requested content object is compared to the utility of content objects stored in local space. If the utility of the requested content object is not greater than that of an existing local space content object, then the method proceeds to step 740. Otherwise, at steps 720 and 730 the requested content object replaces in local space the existing local space content object having a lower utility. Specifically, at step 720, the requested content object is stored in (i.e., promoted to) the local space while at step 730 the existing local space content object is removed from (i.e., demoted from) local space.

At step 740, the utility of the demoted local space content object (or requested content object if the query at step 710 was answered negatively) is compared to the utility of content objects stored in federated space. If the demoted local space content object (or non-promoted requested content object) has a utility greater than that of an existing federated space content object, then the method proceeds to step 750. Otherwise the method exits.

At step 750, a determination is made as to whether the number of copies of the demoted local space content object (or non-promoted requested content object) stored in federated space exceeds a threshold number. If so, then the method exits. Otherwise, at steps 760 and 770 the demoted local space content object (or non-promoted requested content object) replaces in federated space the existing federated space content object having a lower utility. Specifically, at step 760 the demoted local space content object (or non-promoted requested content object) is stored in federated space while at step 770 the existing federated space content object having a lower utility is removed from (i.e., demoted from) federated space.

It will be appreciated by those skilled in the art that while the method 700 of FIG. 7 is depicted as implementing steps in a particular order, the specific order of the may be modified while still practicing the invention. In addition, it will be appreciated that the various embodiments discussed herein with respect to the Figures are modified in response to differing file sizes associated with different content objects. For example, multiple content objects have a relatively small file sizes may be promoted and/or demoted, respectively, the demotion and/or promotion of a content object having a relatively large file size. For sample, a high utility content object having a large file size may replace two or more content objects within local space. These replaced or demoted content objects might themselves replace multiple content objects in federated space. In one embodiment, where only one of the replace or demoted content objects can be inserted into federated space, a determination is made to preferentially insert the content object having the highest utility. If insufficient space exists, then the content object having the smaller file size is inserted as possible.

The methods described herein operate to incrementally and/or gradually adapt the ratio of local space and federated space allocations within a mass storage device in response to changes in content popularity. Those content objects tending to be extremely popular will over time be stored in a local space of content storage nodes. Those content objects tending to be extremely unpopular and will over time be removed from the local space of content storage nodes and stored only in federated space or, if sufficiently unpopular, only at a content vault or other non-cached location. Assuming a normal distribution curve of content object popularity (e.g., such as noted above with respect FIG. 3) the various embodiments operate to balance the storage of content objects based upon popularity between local space and federated space in each of the various content storage nodes or caches.

One embodiment provides an improved cache management scheme wherein the operation of content caches at multiple content storage nodes is adapted to gradually move from individualized caching to cooperative caching of content within the content distribution network (CDN). In this manner, improved caching efficiency from reducing duplication of content is balanced against an improved efficiency from increasing duplication of locally popular content. That is, while full cache cooperation significantly reduces the bandwidth towards the original server (which directly translates to bandwidth savings on the peering links of an Internet service provider), full cache cooperation does increase the amount of traffic exchanged between caches. By intelligently selecting threshold levels of cache cooperation, a CDN according to the various embodiments leverages its available resources to reduce peering links. In various embodiments, a U-turn configuration is provided in which content storage nodes utilize normally unused bandwidth to redistribute content.

This invention provides significant advantages to network operators supporting content dissemination and/or distribution who are able to place storage devices inside the network and have knowledge of the underlying network topology. The benefits include savings in cost of bandwidth, increased usage of unused resources, and improved service to their customers.

The proposed solution takes advantage of the cooperation of a distributed set of cache nodes inside the network along with the knowledge of the underlying network topology to reduce the cost of transit bandwidth by leveraging the use of disk space and unused uplink capacity.

In one embodiment, a content storage node which is serving a geographic area having a strong demographic bias will tend to receive requests for content objects which are generally of less interest elsewhere, particularly for other nodes at the same level in the network. This solution will result in the node's devoting a large portion of its available storage for its local segment, where it will keep the most popular objects for its served population. A small portion of storage will be used as federated space, and will hold content objects of moderate popularity across the entire network. The ratio of local and federated space is tuned based on the proportion of ethnic content and general interest content. As a result, a significant portion of the traffic of this portion of the network will be served locally, with subsequent improvement in response times and reduction in the usage of the upstream link for this node.

In another embodiment, a sudden increase in the global popularity of a given object will result in keeping multiple copies of it across the network. Each copy will be stored in a node's local cache segment, which will relieve the traffic from the source node and will allow the network to adapt to such a sudden change in traffic pattern, while keeping low response times and enhanced responsiveness.

In another embodiment, an object that has been highly popular but has begun to decay in popularity will start to be gradually removed from the local segment of all caches in the network, and will be stored in the federated segment of a single node. As its popularity level keeps decreasing, it will eventually be removed from all storage spaces. This way, the object will be served from inside the network with no need to retrieve it from the content source for as long as its global popularity level allows it to be stored.

In another embodiment of this invention, a new cache-enabled node that is added to the network will start to add its federated segment storage to the global pool, therefore increasing the overall capacity and reducing the network's usage of uplink and downlink bandwidth. All nodes in the network might eventually redistribute their own segment sizes according to the new pool size and current content popularities.

Although various embodiments which incorporate the teachings of the present invention have been shown and described in detail herein, those skilled in the art can readily devise many other varied embodiments that still incorporate these teachings.

What is claimed is:

1. In a content distribution system (CDS) comprising a plurality of content storage nodes (CSNs), each CSN including a storage device allocated between a local space and a federated space, a method for adapting the storage of content, comprising:

receiving a content object request at a CSN;
replacing a content object stored in local space of the CSN with the requested content object if a utility level of the content object stored in local space is less than a utility level of the requested content object;
replacing a content object stored in federated space with the requested content object if a utility level of the content object stored in federated space is less than the utility level of the requested content object and the requested content object does not replace a content object stored in local space;
replacing a content object stored in federated space with the replaced local space content object if the utility level of the content object stored in federated space is less than the utility level of the replaced local space content object.

2. The method of claim 1, wherein replacing a content object stored in federated space comprises transmitting the replacement content object toward the CSN storing the content object to be replaced.

3. The method of claim 2, wherein the replacement content object is transmitted via a parent CSN.

4. The method of claim 1, further comprising adapting the relative allocation of local space and federated space within at least one CSN in response to at least one of network bandwidth cost and storage cost.

5. A computer non-transitory readable medium storing a software program that, when executed by a computer, causes the computer to perform a method for adapting the storage of content, the method comprising:

receiving a content object request at a content storage node (CSN) within a content distribution system (CDS) comprising a plurality of CSNs, each CSN including a storage device allocated between a local space and a federated space;
replacing a content object stored in local space of the CSN with the requested content object if a utility level of the content object stored in local space is less than a utility level of the requested content object;
replacing a content object stored in federated space with the requested content object if a utility level of the content object stored in federated space is less than the utility level of the requested content object and the requested content object does not replace a content object stored in local space;
replacing a content object stored in federated space with the replaced local space content object if the utility level of the content object stored in federated space is less than the utility level of the replaced local space content object.

* * * * *